US006918006B1

(12) United States Patent
Archibald, Jr. et al.

(10) Patent No.: US 6,918,006 B1
(45) Date of Patent: Jul. 12, 2005

(54) SYSTEM AND METHOD TO COORDINATE DATA STORAGE DEVICE MANAGEMENT OPERATIONS IN A DATA STORAGE SUBSYSTEM

(75) Inventors: John Edward Archibald, Jr., Boulder, CO (US); Brian Dennis McKean, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 09/703,822

(22) Filed: Oct. 30, 2000

(51) Int. Cl.[7] .............................................. G06F 12/00
(52) U.S. Cl. ........................ 711/114; 718/102; 710/6
(58) Field of Search ............................... 711/114, 162; 710/4, 6; 712/201, 25; 718/102

(56) References Cited

U.S. PATENT DOCUMENTS

| 5,495,603 | A | | 2/1996 | Fruchtman et al. | |
| 5,696,934 | A | | 12/1997 | Jacobson et al. | |
| 5,881,311 | A | * | 3/1999 | Woods ........................ | 710/4 |
| 6,098,119 | A | | 8/2000 | Surugucchi et al. | |
| 6,260,124 | B1 | * | 7/2001 | Crockett et al. ............ | 711/162 |

FOREIGN PATENT DOCUMENTS

| EP | 0 629 962 A2 | 12/1994 |
| WO | WO 99/63442 | 12/1999 |

OTHER PUBLICATIONS

Patterson et al, "A Case for Redundant Arrays of Inexpensive Disks (RAID)," Proceedings of the 1988 ACM SIGMOD international conference on Management of data, 1998, pp. 109–116.*

* cited by examiner

*Primary Examiner*—Matthew Kim
*Assistant Examiner*—Shane M. Thomas
(74) *Attorney, Agent, or Firm*—Dorsey & Whitney LLP

(57) ABSTRACT

The invention provides system, apparatus and procedure to coordinate the data management operations in a data storage system. The data management operations are performed on data stripes, which are distributed across a plurality of disk drives. According to the procedural aspect of the invention a task director first executes a first operation and a second operation of the data management operations at a concurrent time. The first operation is a different operation than the second operation. The first operation includes a first set of tasks and the second operation includes a second set of tasks. The execution of each task of the first and second sets of tasks are directed by the task director.

22 Claims, 4 Drawing Sheets

SYSTEM AND METHOD TO COORDINATE DATA STORAGE DEVICE MANAGEMENT OPERATIONS IN A DATA STORAGE SUBSYSTEM

FIELD OF THE INVENTION

The invention relates to data storage systems. More particularly, the invention pertains to coordinating the execution of one or more data management operations on a data storage sub-system in a manner that provides for concurrently executing data management operations.

BACKGROUND OF THE INVENTION

Existing data storage management operations include independent operations that operate on user data and/or metadata. Such data storage device array control operations include, for example: (a) data consistency checks to detect and in some cases correct parity data inconsistencies; (b) array managed backup strategies; (c) logical drive rebuilds of redundancy in volume sets with failed member disks; (d) volume set initialization operations; (e) hierarchical storage management operations; (f) virtual storage automatic resource allocator operations; (g) methods of reporting when thresholds for system resource utilization have been met or exceeded, and the like. A volume set is a disk array object that most closely resembles a single logical disk when viewed by the operating environment in host computer. These operations are typically independently executed in a serial fashion by a system administrator as either foreground processes or as background processes. Procedures for performing such data management operations are known in the art of data storage system administration.

Such independently executing disk array control operations complete for processor and data storage device resources. For example, known data storage device data consistency check operations independently scan volume set media surfaces including all data and parity sectors associated with a given stripe of data in a volume set, and typically perform operations on all data bytes in those sectors to determine if parity stored for that stripe is consistent with the host data stored in the stripe. Likewise, known array managed backup operations also independently scan volume set media surfaces including all data and parity sectors contained in the volume set and perform certain operations on the data. These prior art techniques are typically limited in that if the data consistency check operation and the array backup operation are concurrently executed, multiple redundant scans of the media surfaces and associated data operations are generally performed on the same data and parity sectors in a given volume set.

With today's configured storage pool sizes not uncommonly in the multiple gigabyte or even multiple terabyte range, and with the time it takes to scan and perform common and/or unique operations on data, these known independent methods are much too inefficient from both a time and system resource perspective. Often, known independently scheduled operations require more time to complete than there are hours in a day. What is needed is a system and method for coordinating the execution of disk array control operations, such that the amount of time that is required to execute the operations is substantially reduced.

SUMMARY

The invention provides coordinated management of data management operations to substantially reduce the time and system resources required for data management operations that is not possible in the prior art. This is accomplished by implementing a comprehensive task director (CTD) methodology to conditionally perform such control operations based on requirements of concurrently executing data management operations.

One aspect of the invention is a method implemented in a data storage subsystem that is managed by a set of data management operations. The method coordinates the execution of the data management operations by first concurrently executing, by a task director, a first data management operation and a second data management operation. The first operation includes a first set of tasks and the second operation includes a second set of tasks. Next, the method controls the execution or the non-execution of each task of the first and second sets of tasks based on a set of predetermined rules.

In yet another aspect, the invention is a data storage system providing coordinated management of data management operations. The system includes one or more data storage devices connected to a managing device. The managing device includes a memory for storing data and computer program instructions for a task director to perform the data management operations, which include a first operation and a second operation. The first operation including a first set of tasks and the second operation including a second set of tasks.

The managing device also includes a processor for fetching the data from the memory and executing the task director. First, the task director concurrently executes the first operation and the second operation. The first operation includes a first set of tasks and the second operation includes a second set of tasks. Next, the task director controls the execution or the non-execution of each task of the first and second sets of tasks based on a set of predetermined rules.

In yet another aspect, the invention is a managing device to coordinate data management operations in a data storage subsystem. The management device includes, one or more communication ports to couple to one or more data storage devices, and a memory to store data and a task director to perform one or more data management operations. The data management operations include a first operation and a second operation. The first operation includes a first set of tasks and the second operation includes a second set of tasks.

The managing device also includes a processor for fetching the data in the memory and executing the task director, which in turn concurrently executes the first operation and the second operation. Next, the managing device controls the execution of the first and second operation based on a predetermined set of rules.

DETAILED DESCRIPTION OF EMBODIMENTS OF THE INVENTION

The invention provides coordinated management of concurrently executing data management operations in a data storage subsystem by implementing a comprehensive task director (CTD) to direct the execution of the management operations, such that the time and system resources utilized are substantially reduced as compared to prior art data management methodologies. Before discussing the methodology of the invention, aspects of an exemplary system and an apparatus of the invention are first described.

Figure 1:
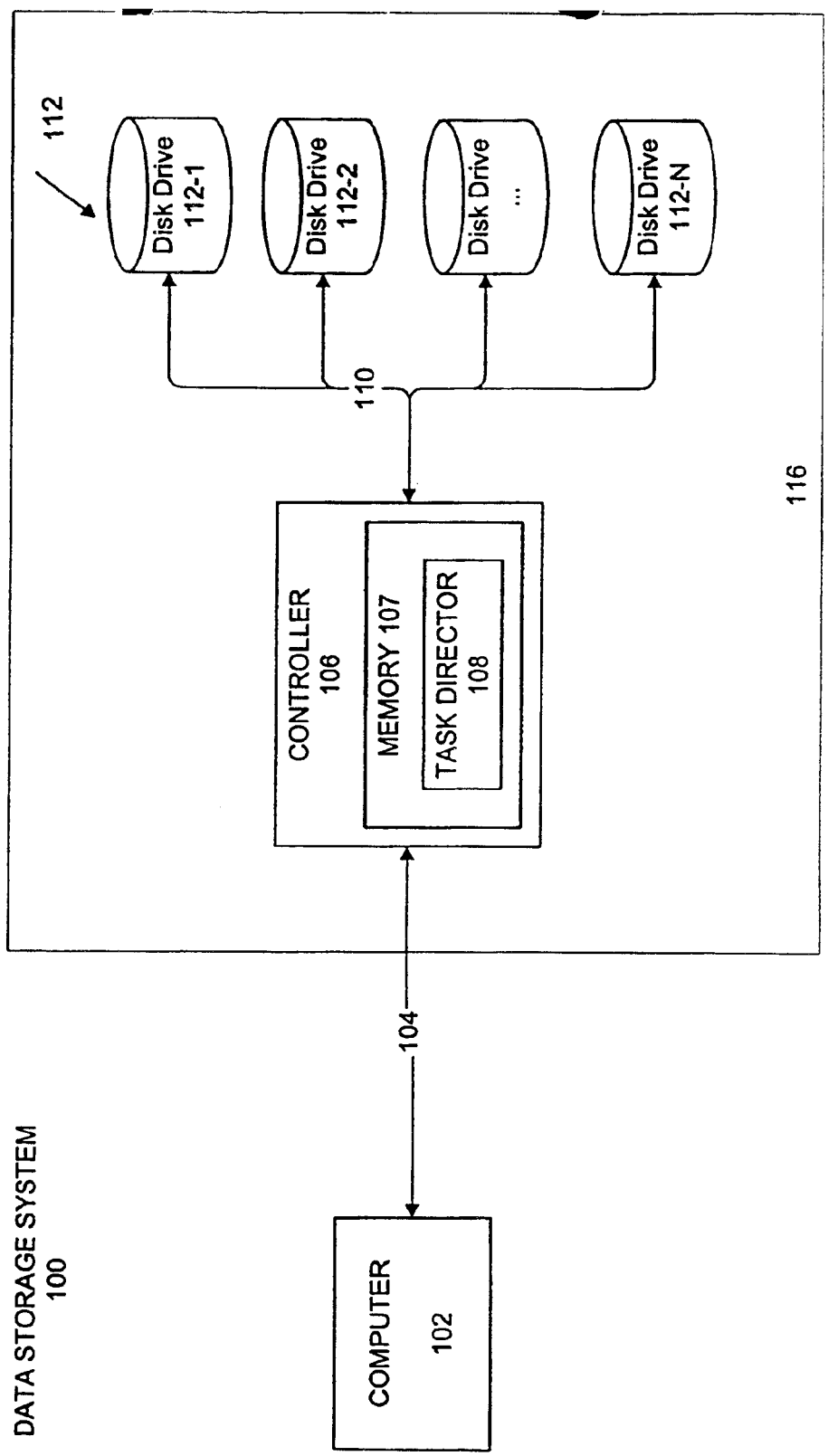
FIG. 1 is a block diagram that illustrates a system for coordinating data management operations, according to one embodiment of the invention.

Referring to FIG. 1, there is a block diagram that illustrates aspects of a Redundant Array of Independent Disks (RAID) data storage system 100, according to one embodiment of the invention. RAID uses several magnetic or optical desks, known as a disk array, working together to increase this capacity, improve data transfer rates and provide higher system reliability. Techniques for implementing a RAID without the conventions of the invention described below, are known in the art.

System 100 includes computer 102 connected across I/O interface 104 to controller 106. Computer 102 is any type of computer having a processor couple to a memory (not shown) for fetching data and executing computer program instructions (not shown) stored in the memory. Such computer program instructions are used to perform data I/O operations with respect to one or more disk drives 112-1 through 112-N. I/O interface 104 can be any type of I/O interface, for example, a Small Computer Systems Interface (SCSI) I/O interface. SCSI I/O protocols are known in the art.

Controller 106 is a disk array controller for striping data to and from disk drives 112-1 through 112-N according to the particular RAID level being used in system 100. Various RAID levels are known in the art of configuring RAID data storage systems. Controller 106 is connected across I/O interface 110 to disk drives 112-1 through 112-N. I/O interface 110 can be any type of I/O interface, for example, a fibre channel interface or a SCSI interface. Disk drives 112-1 through 112-N represent any non-volatile, randomly accessible, re-writable mass storage device which has the ability of detecting its own storage failures. Such mass storage devices may include both rotating magnetic and optical disks and solid-state disks, or non-volatile electronic storage elements, for example, PROMS, EPROMS, and EEPROMS.

Controller 106 includes a processor (not shown) for fetching data and computer program instructions stored in memory 107 to perform the I/O operations discussed above, and to coordinate data management operations across disk drives 112-1 through 112-N. For example, task director 108 is implemented as computer program instructions and used by controller 106 to coordinate data management operations across disk drives 112-1 through 112-N. In contrast to the prior art, wherein such operations are typically executed as independent serial tasks, task director 108 executes such operations in either a serial or a concurrent (in parallel) manner, such that the time and amount of system resources required to execute such operations are substantially reduced as compared to the prior art. Aspects of exemplary computer program instruction modules of memory 107 are described in greater detail below in reference to FIG. 2.

Although task director 108 is illustrated as being implemented in the memory 107 of controller 106, task director 108 can be implemented in a memory coupled to one or more other components of data storage system 100. For example, task director 108 can be implemented in a memory of a fibre switch (not shown) used to switch I/O in a fibre channel system 100. Aspects of an exemplary procedure of task director 108 are described in greater detail below in reference to FIG. 3.

Figure 2:
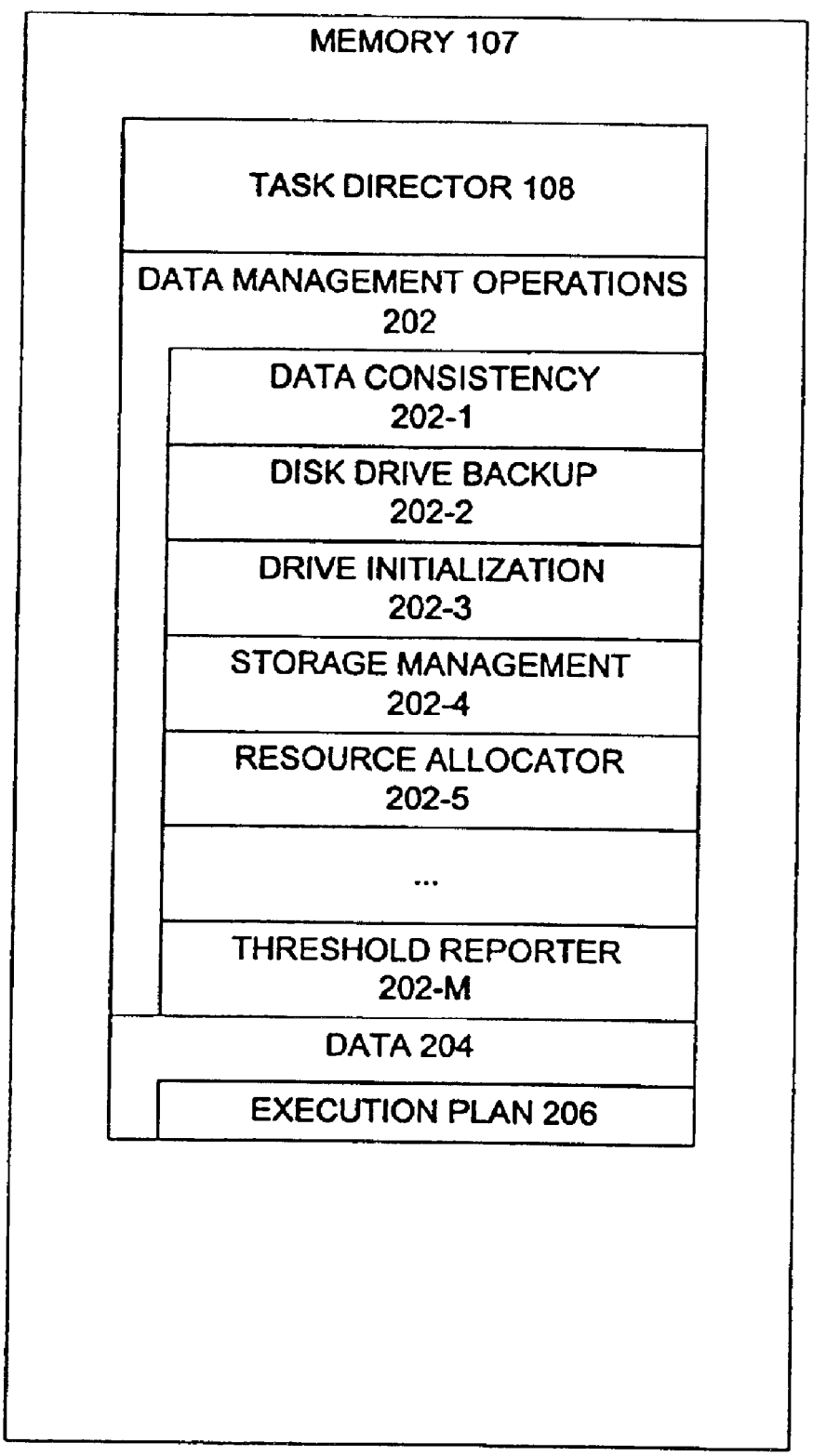
FIG. 2 is a block diagram that illustrates an exemplary disk array controller memory for coordinating data management operations, according to one embodiment of the invention.

Referring to FIG. 2, there is a block diagram that illustrates aspects of an exemplary memory 107, according to one embodiment of the invention. Memory 107 stores data 204 and computer program instructions includes computer programming instructions for task director 108 and a number of data management operations 202. Such data management operations 202 include, for example, data consistency check operation 202-1, disk drive backup operation 202-2, drive initialization operation 202-3, storage management operation 202-4, resource allocator operation 202-5, and threshold reporter operation 202-M.

Each data management operation 202 includes one or more respective tasks. For example, data consistency check 202-1 includes data generation and data comparison tasks. Additionally, if a system administrator determines a data inconsistency should be corrected, data consistency check 202-1 also includes a data correction task. In yet another example, disk drive backup 202-2 includes copying the data in a volume set to another volume set in the array or to a device external to the array.

Task director 108 directs either the serial or concurrent execution of one or more data management operations 202 according to an execution plan. The execution plan indicates which data management operations 202 are to be executed by task director 108 and the order and times that they are to be executed. For example, in one embodiment, the execution plan indicates that one data management operation 202 is to be executed concurrently with one or more other data management operations 202. To illustrate this, consider that execution plan may indicate that data consistency operation 202-1 is to be executed concurrently with disk drive backup operation 202-2.

In one embodiment, the execution plan is stored as a file, for example, execution plan 206, in memory 107. In yet another embodiment, the execution plan is a set of commands sent from computer 102 to task director 108 at particular times. Such commands can be a number of different commands, for example, SCSI commands with vendor specific data fields set to indicate that one or more data management operations 202 are to be executed.

Figure 3:
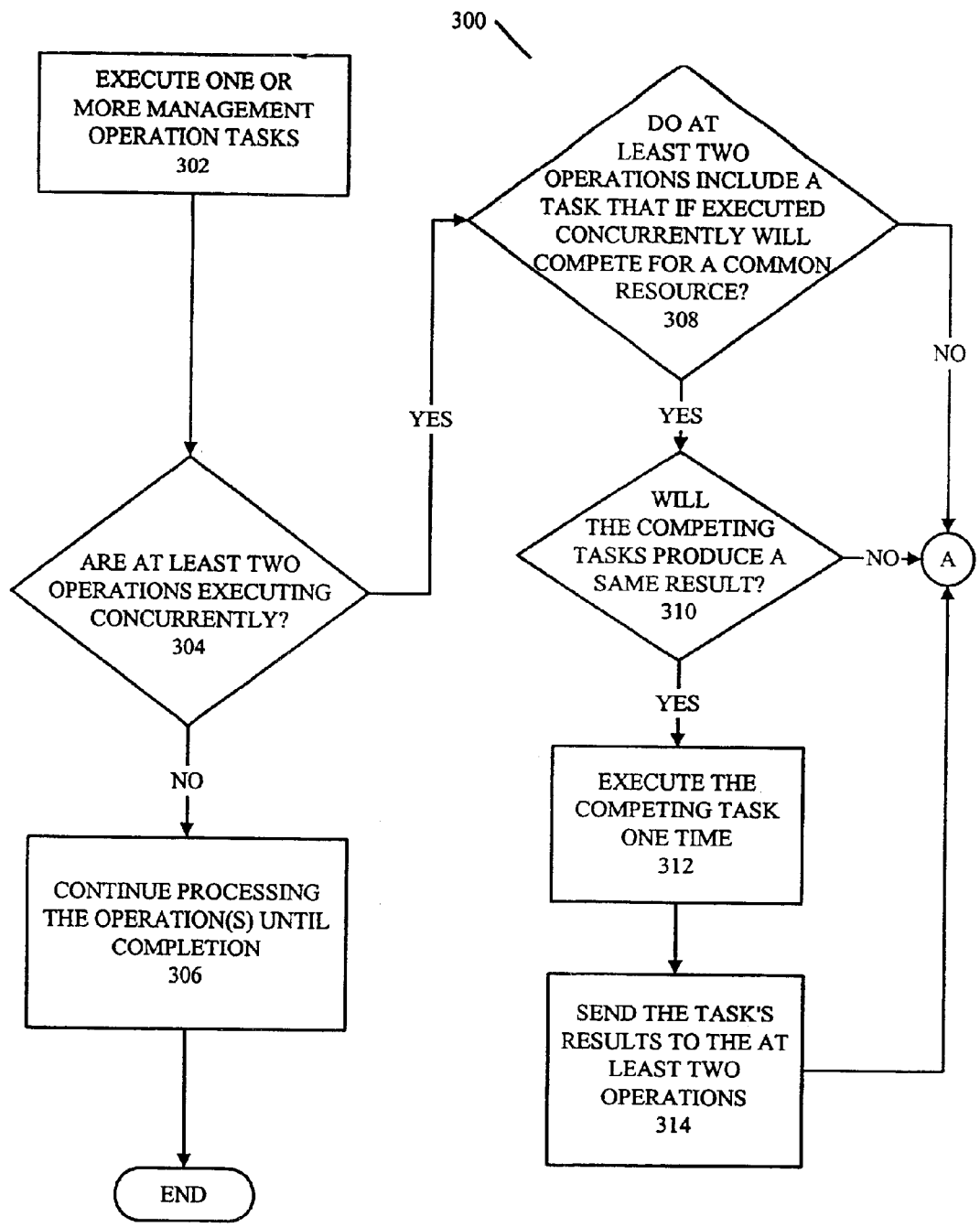
FIG. 3 is a flowchart diagram that illustrates an exemplary procedure to coordinate data management operations, according to one embodiments invention; and, FIG. 4 is a flowchart diagram that illustrates an exemplary procedure to coordinate data management operations, according to one embodiments invention.

We now describe aspects of an exemplary procedure of task director 108 in reference to FIG. 3. Referring to FIG. 3, there is a flow diagram that illustrates aspects of exemplary task procedure 300 of task director 108, according to one embodiment invention. This detailed description of procedure 300 assumes that a volume set has already been defined across disk drives 112-1 through 112-N (see FIG. 1) and that computer 102 is configured to utilize the defined volume set. Procedures for defining volume sets and configuring computers to use them are known in the art.

In step 302, procedure 300 executes at least two data management operations 202 (see FIG. 2). In step 304, procedure 300 determines if there are at least two data management operations 202 executing concurrently, or in parallel. For example, if task manager 108 executes a disk drive backup operation 202-2 and a data consistency check operation 202-1, such that they are executing at the same time or at substantially the same time, they are said to be executing concurrently, or in parallel. It can be appreciated that more than two data management operations 202 can be concurrently executed by task director 108. It is also noted that different operations 202 may consume different periods of time so that concurrent time refers to execution with time overlap between the different operations 202.

If no data management operations 202 are executing concurrently (step 304), in a step 306 procedure 300 continues processing the one or more data management operations 202 (step 302) until each of their respective tasks have completed.

However, if one or more data management operations 202 are executing concurrently (step 304), in step 308 procedure 300 determines whether at least two of the concurrently executing operations 202 include one or more respective tasks that if executed concurrently would compete for common resource. For example, if data consistency check operation 202-1 and disk drive backup operation 202-2 are concurrently executing and each is scheduled to perform one or more operations on a given volume set (distributed across any two or more disk drives 112-1 through 112-N, see FIG. 1) withing a specified same period of time, the two concurrently executing operations 202 are said to be competing for a common resource. In this example, they are competing for access to the given volume set.

If at least two tasks will compete for a common resource (step 308), in step 310 procedure 300 determines if the competing tasks will produce a common result. For example, data consistency check operation 202-1 includes a task to read all sectors (data and metadata) in a predetermined data stripe within a predetermined volume set. Similarly, disk drive backup operation 202-2 includes a task to read all sectors (data and metadata) in a predetermined data stripe within a predetermined volume set. If the predetermined data stripe and the predetermined volume set are equivalent for both operations 202, then the result of the respective tasks will be the same.

If it is determined that the competing tasks will produce a common result (step 310), in step 312 procedure 300 executes a single task to produce the common result identified in step 310 without executing each of the tasks identified as producing a common result. In step 314, procedure 300 communicates the common result (step 312) to each respective data management operation 202 that corresponds to a respective tasks identified as producing a common result (step 310). Procedure 300 continues at step 316 as illustrated in FIG. 4.

Figure 4:
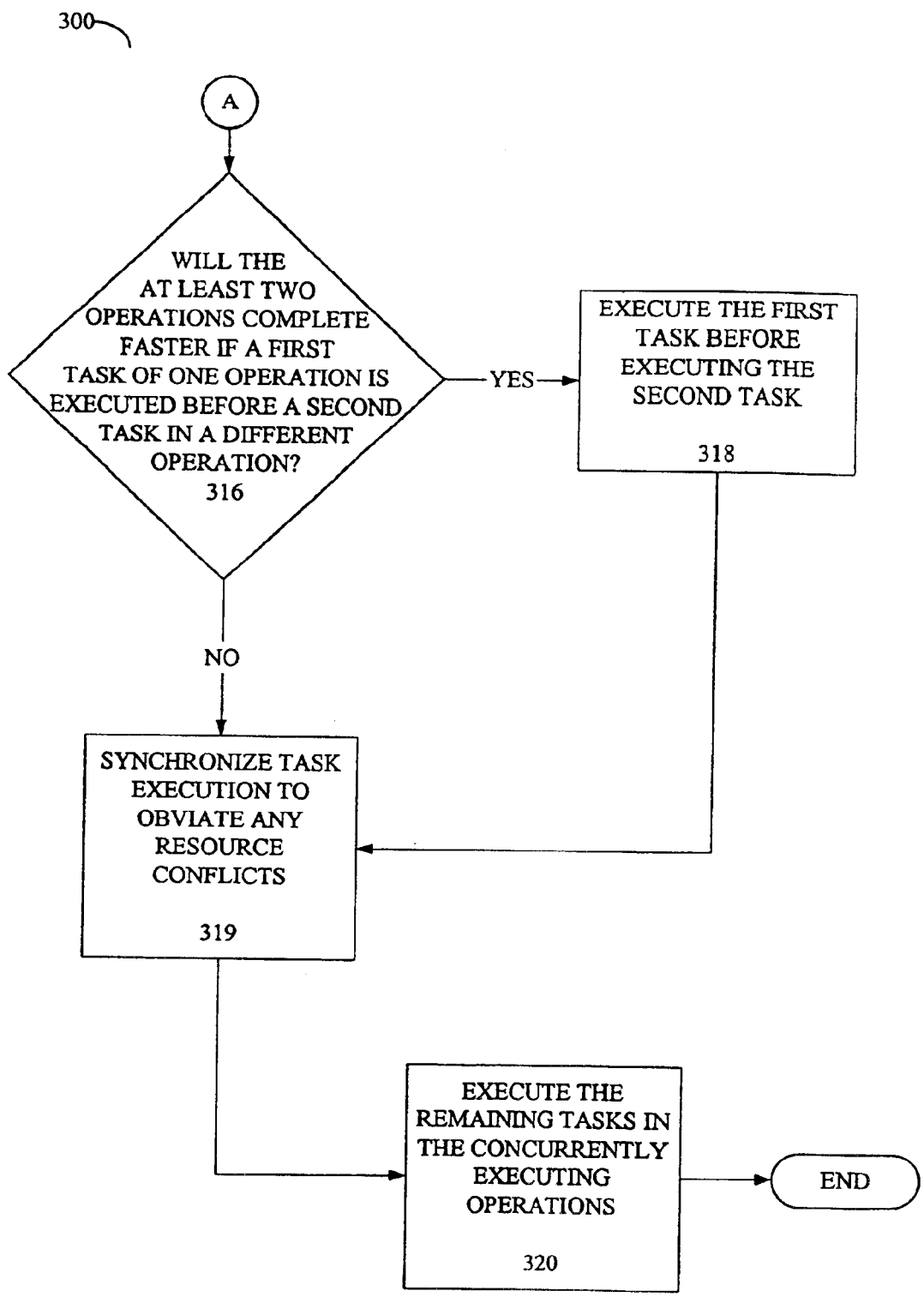

Referring to FIG. 4, there is a flowchart diagram that illustrates aspects of procedures 300 of task director 108, according to one embodiment of the invention. In step 316 procedure 300 determines if a first task corresponding to a first data management operation 202 will complete faster if the first task is executed before a second task of a second data management operation 202 is executed.

For example, consider that the first operation 202 may be a data consistency check operation 202-1 with first task of correcting any data inconsistencies found in a predetermined data stripe of a predetermined volume set. Additionally, consider that the second operation may be disk drive backup operation 202-2 with a second task of identifying if the predetermined data stripe has been modified since a last backup operation 202-2 was performed. Furthermore, consider that the second task is performed before the first task, and consider that first task finds and corrects a data inconsistency on the predetermined data stripe. In this example, it is necessary to execute the second task a second time to provide an up-to-date backup of the modified predetermined data stripe. Such an execution order results in a longer execution time as compared to the execution time that would have been required had the first task been executed before the second task.

If it is determined that the amount of time required for the at least two operations 202 to execute would be increased if a first task is executed after a second task (step 316), in step 318 procedure 300 executes the first task before executing the second task to reduce the amount of time required to execute the at least two operations 202.

In step 320 procedure 300 synchronizes the execution of each of the remaining respective tasks that correspond to the one or more concurrently executing operations 202 (step 304), such that the executing tasks will not cause resource conflicts. A resource conflict is commonly referred to as a race condition that occurs when one task accesses a memory location at a substantially simultaneous time as another task accesses on the memory location. Such accesses can be read and/or write accesses. Race conditions are known and can produce erroneous data results. Procedures for preventing substantially simultaneous access to a particular memory location between concurrently executing computer program applications are known.

In one embodiment, procedure 300 prevents such race conditions by locking the memory location before a task accesses the memory location and unlocking the memory location after the task has completed accessing the memory location. Upon locking the memory location only the task that performed the locking step has access to the memory location. Such a locking operation can be performed by a number of different mechanisms. For example, the SCSI protocol can be used to lock a memory location on disk drives 112-1 through 112-N (see FIG. 1).

As can be appreciated from the above description of the system 100 (see FIG. 1), apparatus (see FIG. 2) and procedure (see FIGS. 3 and 4) of the invention, the execution of data management operations 202 are directed by task director 108, such that task director 108: (a) provides means to direct the execution of concurrently execution data management operations 202; (b) prevents concurrently executing operations 202 that compete for a same resource from producing resource conflicts; and (c) reduces the amount of time typically required to execute two or more data management operations.

The foregoing description, for purposes of explanation, used specific nomenclature to provide a thorough understanding of the invention. However, it will be apparent to one skilled in the art that the specific details are not required in order to practice the invention. In other instances, well known circuits, devices, software modules, and the like are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

The embodiments were chosen and described to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. In a data storage system managed by a set of data management operations, a method to coordinate the set of data management operations wherein data management operations are performed on a set of data storage volumes distributed across a plurality of disk drives, the method comprising:

concurrently executing, by a task director, a first data management operation and a second data management operation, the first data management operation having a first set of tasks and the second data management operation having a second set of tasks; and, controlling, by the task director, the execution or the non-execution of each task of the first and second sets of tasks based on a set of predetermined rules comprising:

determining, by the task director, if a first task of the first set of tasks and a second task of the second set of tasks compete for a common resource on the plurality of disk drives;

if the first task and the second task compete for a common resource, identifying if the first task and the second task will produce a common set of results upon their respective executions; and, if the first and second tasks would produce the common set of results, executing a single task to produce the common set of results, such that the first task and the second task are not both executed.

2. The method of claim 1, wherein in the step of concurrently executing, the first data management operation being a different operation as compared to the second operation.

3. The method of claim 1, wherein in the step of controlling, the predetermined rules further comprising:

determining, by the task director, whether (i) a total amount of time required to execute the first and second data management operations would decrease if a first task of the first set of tasks is executed before a second task of the second set of tasks; or, (ii) a set of resources utilized by the task director would decrease if a first task of the first set of tasks is executed before a second task of a second set of tasks; and, if the total amount of time required would be decreased, or if the set of resources would be decreased, executing by the task director, the first task before the second task, such that the total amount of time or the task director's utilization of the set of resources are reduced while concurrently executing the first and second data management operations.

4. The method of claim 1, further comprising a step of communicating, by the task director, the common set of results to the first data management operation and the second data management operation.

5. The method of claim 4, wherein in the step of executing the single task, the single task is a different task from both the first and second tasks.

6. The method of claim 1, wherein in the step of executing the single task, the single task is one of the first and second tasks.

7. The method of claim 1, wherein in the step of concurrently executing, the first and second data management operations are selected from a group of operations consisting of a data consistency check operation, a data backup operation, a storage drive rebuild operation, a volume set initialization operation, a hierarchical storage management operation, a virtual storage automatic resource allocation operation, and system resource allocation threshold reporting operation.

8. The method of claim 7, wherein the data management operations are performed on a data stripe on a data storage volume distributed across a plurality of disk drives, and wherein in the step of concurrently executing, the first data management operation is a data consistency check operation to detect parity data inconsistencies on a volume set, and the second data management operation is a data backup operation.

9. The method of claim 8, further comprising indicating that a parity data inconsistency was detected.

10. The method of claim 1, wherein the data management operations are performed on a set of data stripes on a data storage volume distributed across a plurality of disk drives, and wherein the total amount of time is increased if the first and second sets of tasks are performed on the a same data stripe of the set of data stripes.

11. A method according to claim 1, wherein the data storage system comprises a RAID data storage system.

12. A data storage system providing coordinated management of data management operations, the system comprising:

one or more data storage devices;

a managing device coupled to the data storage devices, the managing device comprising:

a memory for storing managing device data and a task director comprising a set of computer program instructions to perform a set of data management operations comprising a first data management operation and a second data management operation, the first data management operation being a different data management operation as compared to the second data management operation, the first data management operation comprising a first set of tasks and the second data management operation comprising a second set of tasks; and a processor for fetching the managing device data and executing the task director to:

(a) concurrently execute the first data management operation and the second data management operation, the first data management operation having a first set of tasks and the second data management operation having a second set of tasks and, (b) control the execution or the non-execution of each task of the first and second sets of tasks based on a set of predetermined rules comprising logic to:

determine if a first task of the first set of tasks and a second task of the second set of tasks compete for a common resource on the plurality of disk drives;

if the first task and the second task compete for a common resource, identify if the first task and the second task will produce a common set of results upon their respective executions; and, if the first and second tasks would produce a common set of results, execute a single task to produce the common set of results, such that the first task and the second task are not both executed.

13. The system of claim 12, wherein the predetermined set of rules comprise logic to:

(a) determine if a total amount of time required to execute the first and second data management operations would increase if a first task of the first set of tasks is executed before executing a second task of the second set of tasks; and, (b) if the total amount of time would increase, execute the second task before the first task.

14. The system of claim 12, wherein the predetermined set of rules further comprise logic to:
communicate the common set of results to the first operation and the second operation.

15. A data storage system according to claim 12, wherein the data storage system comprises a RAID data storage system.

16. A management device to coordinate data management operations in a data storage subsystem, the management device comprising:
one or more communication ports to couple to one or more data storage devices;
a memory for storing management device data and a task director comprising a set of computer program instructions to perform one or more data management operations comprising a first data management operation and a second data management operation, the first data management operation having a first set of tasks and the second data management operation having a second set of tasks, the first data management operation being a different data management operation as compared to the second data management operation; and,
a processor for fetching the management device data and executing the task director to:
(a) concurrently execute the first data management operation and the second data management operation, the first data management operation having a first set of tasks and the second data management operation having a second set of tasks and,
(b) control the execution or the non-execution of each task of the first and second sets of tasks based on a set of predetermined rules comprising logic to:
determine if a first task of the first set of tasks and a second task of the second set of tasks compete for a common resource on the one or more data storage devices;
if the first task and the second task compete for a common resource, identify if the first task and the second task will produce a common set of results upon their respective executions; and,
if the first and second tasks would produce a common set of results, execute a single task to produce the common set of results, such that the first task and the second task are not both executed.

17. The management device of claim 16, wherein the predetermined set of rules further comprise logic to communicate the common set of results to the first data management operation and the second data management operation.

18. A data storage system according to claim 16, wherein the data storage subsystem comprises a RAID data storage subsystem.

19. A computer program product for use in conjunction with a processor, the computer program product comprising a first computer readable storage medium and a computer program mechanism embedded in the computer readable storage medium, the computer program mechanism being responsive to communication from a management device, the computer program mechanism comprising a task director to coordinate a plurality of data management operations, wherein the plurality of data management operations are performed on a set of data storage volumes distributed across a plurality of disk drives, the task director including instructions for:
concurrently executing, by the task director, a first data management operation and a second data management operation, the first operation having a first set of tasks and the second operation having a second set of tasks; and,
controlling, by the task director, the execution or the non-execution of each task of the first and second sets of tasks based on a set of predetermined rules comprising:
determining, by the task director, if a first task of the first set of tasks and a second task of the second set of tasks compete for a common resource on the plurality of disk drives;
if the first task and the second task compete for the common resource, identifying if the first task and the second task will produce a common set of results upon their respective executions; and,
if the first and second tasks would produce the common set of results, executing a single task to produce the common set of results, such that the first task and the second task are not both executed.

20. The computer program product of claim 19, wherein in the instructions for controlling, the first data management operation is a different data management operation as compared to the second data management operation.

21. The computer program product of claim 19, wherein in the instructions for controlling, the predetermined rules comprise:
determining, by the task director, whether:
(i) a total amount of time required to execute the first and second data management operations would decrease if a first task of the first set of tasks is executed before a second task of the second set of tasks; or,
(ii) a set of resources utilized by the task director would decrease if a first task of the first set of tasks is executed before a second task of the second set of tasks; and,
if the total amount of time required would be decreased, or if the set of resources would be decreased, executing, by the task director, the first task before the second task, such that the total amount of time or the task director's utilization of the set of system resources are reduced while concurrently executing the first and second data management operations.

22. A computer program product according to claim 19, wherein the plurality of storage devices are configured as a RAID system.

* * * * *